United States Patent [19]

Scheel

[11] Patent Number: 5,191,844
[45] Date of Patent: Mar. 9, 1993

[54] PROCESS AND APPARATUS FOR THE TREATMENT OF DUST OR LIKE MATERIAL WHICH IS CAPABLE OF TRICKLE FLOW

[75] Inventor: Hans-Joachim Scheel, Niederfischbach, Fed. Rep. of Germany

[73] Assignee: Alb. Klein GmbH & Co. KG, Niederfischbach, Fed. Rep. of Germany

[21] Appl. No.: 821,794

[22] Filed: Jan. 16, 1992

[30] Foreign Application Priority Data

Jan. 25, 1991 [DE] Fed. Rep. of Germany ....... 4102168

[51] Int. Cl.[5] .............................................. F23G 5/00
[52] U.S. Cl. .................... 110/346; 110/236; 110/245; 110/250
[58] Field of Search ............... 110/346, 245, 236, 250, 110/165 A; 422/146, 139; 241/DIG. 10

[56] References Cited

U.S. PATENT DOCUMENTS

| | | | |
|---|---|---|---|
| 3,841,240 | 10/1974 | Wentworth et al. | 110/236 |
| 4,476,098 | 10/1984 | Nakamuri et al. | 422/146 X |
| 4,648,332 | 3/1987 | Goehart | 110/236 X |
| 4,821,654 | 4/1989 | Becker et al. | 110/236 |

Primary Examiner—Edward G. Favors
Attorney, Agent, or Firm—Bachman & LaPointe

[57] ABSTRACT

In a process for the treatment of dust or the like containing organic constituents, in particular filter dust from foundry sands containing binding agent, the dust is introduced into a fluidizable heat carrier of refractory material, heated and burnt, wherein the heat carrier is preferably preheated to receive the dust. An apparatus for carrying out that process, a loose material bed comprising a fluidizable refractory material is arranged as a heat carrier in a combustion chamber of a furnace on a fluidization plate, and provided in the heat carrier are a heating means and at least one feed means for the dust.

14 Claims, 1 Drawing Sheet

PROCESS AND APPARATUS FOR THE TREATMENT OF DUST OR LIKE MATERIAL WHICH IS CAPABLE OF TRICKLE FLOW

BACKGROUND OF THE INVENTION

The present invention relates to a process for the treatment of dust or like material which is capable of trickle flow, said dust containing organic constituents, more especially filter dust from foundry sands containing binding agents or the like. In addition the invention concerns an apparatus for carrying out that process.

For decades the practice has been simply to dispose of filter dust from dry filter installations of foundry works, with the foundry waste sand, on dumps. Now, when the new law governing the dumping of waste has come into force, filter dust must be deposited on special dumps if it cannot be put to another use.

In recognition of that mode of disposal, the invention set himself the aim of improving the disposal of dust or like material which is capable of trickle flow of the kind referred to above.

SUMMARY OF THE INVENTION

The foregoing object is achieved by way of the present invention wherein the dust is introduced into a fluidisable heat carrier of refractory material, heated and burnt, wherein the heat carrier is preferably preheated to receive the dust; the procedure involved makes use of the fact that filter dust generally includes an enrichment of high-energy, organic and therefore burnable noxious substances and in accordance with the invention an inerting operation is carried out by a thermal procedure.

Admittedly, so-called fluidised bed firing installations are known as an effective combustion procedure, but such processes are not suitable for burning dusts for the purposes of inerting thereof; due to the fact that the individual dust particles have low and different speeds of sinking movement, it was hitherto not possible to guarantee a defined residence time for the dust, as is required for inerting thereof, at a high temperature.

In carrying the process according to the invention into effect, the dust is preferably introduced in the lower region of the heat carrier and the starting energy is taken from a heat source which is provided at that location and which in particular can comprise electrical heating bars; it is also possible however to use heating devices, more especially in bar or tube form, which are heated by gas, oil, steam or the like.

In accordance with a further feature of the invention, in the refractory, fluidisable and heated heat carrier, the dust which is introduced is increased in temperature to the combustion temperature, the heat carrier having a speed of sinking movement which is higher than that of the dust.

The neat carrier therefore acts as a thermal mass which on the one hand quickly heats the dust to ignition temperature but which on the other hand prevents the dust from moving upwardly excessively quickly. The heat carrier is circulated by a fluidisation air which is introduced in a pulsating manner, while an air flow which is dependent on the flow for combustion of the organic substances in the dust also flows through the heat carrier. The residence time of the dust is controlled by the height of the bulk material bed of the heat carrier material and by the fluidisation air which is introduced in a pulsating mode. It is so selected that the dust is made completely free of combustible substances.

After the combustion temperature is reached in a starting phase, the production of heat of the preferably electrical heating means is reduced or at least partially switched off, depending on the respective energy content of the dust to be treated. Combustion then takes place substantially or entirely autarkically. The residence time of the dust in the heat carrier is advantageously determined by the supply of dust and/or by fluidisation air which is superimposed on the steady flow of fluidisation air required for fluidisation purposes. In addition the flow speed above the fill of heat carrier material is to be so controlled that it is greater than the speed of sinking movement of the dust; that causes the dust to be discharged.

An apparatus which is suitable for that process for thermal inerting of the dust and for removal of its combustible components is distinguished in that disposed in a combustion chamber of a furnace on a fluidisation plate is a loose material bed comprising a fluidisable refractory material as a heat carrier, and provided in same is a heating means and over the heating means at least one feed means for dust.

Preferably, extending above the fluidisation plate is at least one heating bar which is or are provided with the feed means at a small distance above the fluidisation plate. In accordance with a further feature of the invention, disposed in the head or top region of the loose material bed is at least one air feed which helps to regulate the flow speed in the above-mentioned fashion. Likewise, an outlet for dust particles with a high speed of sinking movement may be provided in the head or top region of the heat carrier or bed of material.

Connected to the combustion chamber is a flow path which is defined by deflection surfaces or the like fitments, possibly being in the form of a meander-like flue gas duct, which is followed by at least one separator, in particular a cyclone apparatus; the non-combustible constituents of the dust are separated off in the separator; the gases from which the non-combustible constituents have been removed then pass into a recuperative heat exchanger which is part of the fluid flow feed and preheats same. The dust through-put rate can be regulated in accordance with the energy content of the dusts. When dealing with dusts with a very high energy content, the recuperator can be by-passed.

DRAWINGS

Further advantages, features and details of the invention will be apparent from the following description of a preferred embodiment and with reference to the diagrammatic drawing in which:

FIG. 1 is a view in longitudinal section through a furnace with discharge devices arranged downstream thereof, and FIG. 2 is a view in section through the furnace taken along line TT—TT in FIG. 1.

DETAILED DESCRIPTION

Figures 1, 2:
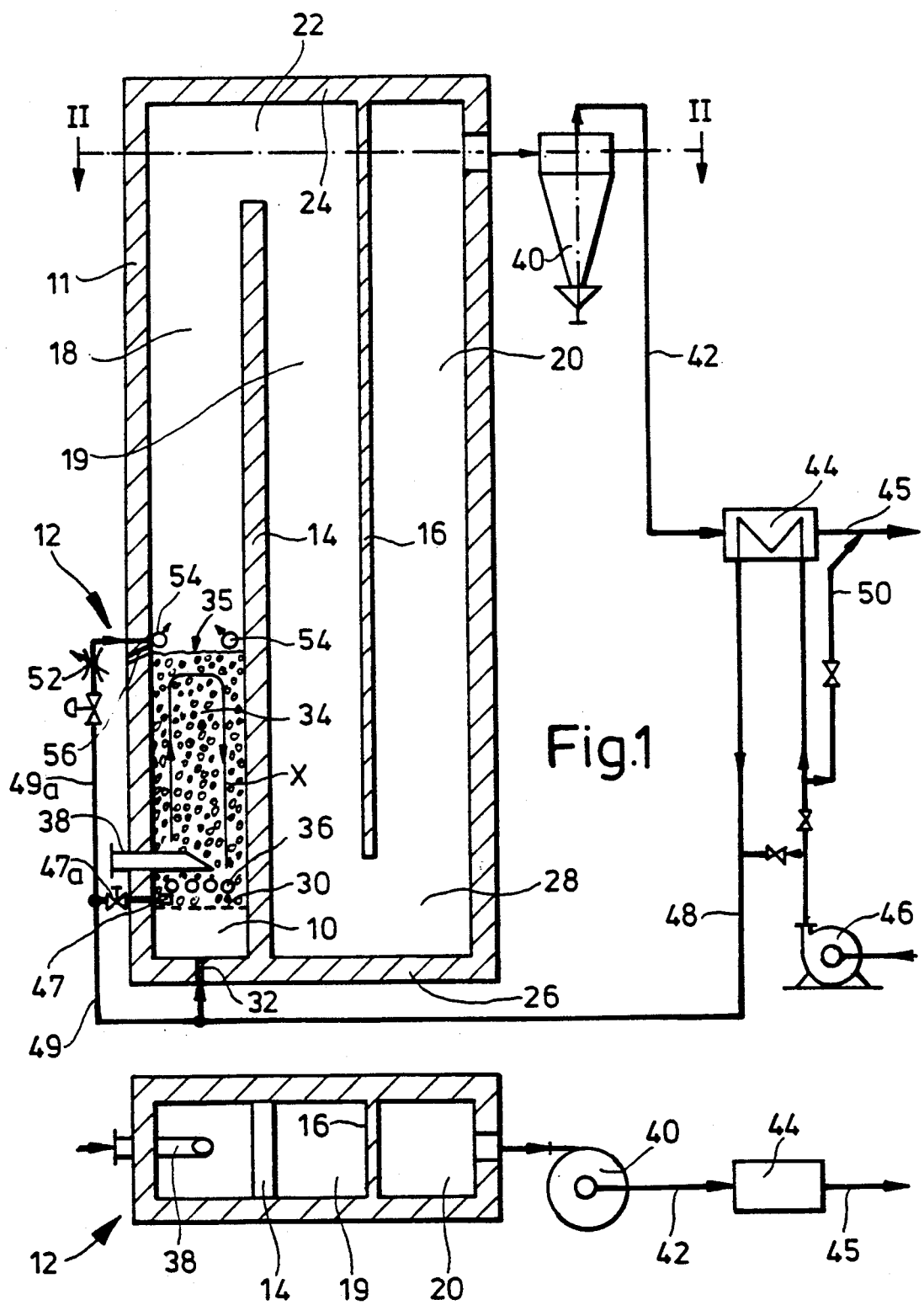

The interior 10 of a furnace 12 is divided by partitions 14 and 16 into a furnace chamber with a flue gas chamber 18 disposed thereabove, and two further flue gas chambers 19 and 20 adjoining the latter, the partition 14 which defines the furnace chamber terminates at a spacing relative to a furnace top 24, forming an upper flue gas passage 22, while the other partition 16 extends from the furnace top 24 to a lower flue gas passage 26 which is formed with a furnace bottom portion 26.

Extending across the furnace chamber is a porous, preferably grid-like fluidisation plate 30, below which is an air feed indicated at 32. Disposed on the fluidisation plate 30 is a loose material bed comprising a refractory fluidisable heat carrier 34 with a high speed of sinking movement. Above the fluidisation plate 30, preferably electrical heating bars which are indicated at 36 pass through the bed of heat carrier material.

An injection nozzle 38 extends through an outside wall 11 of the furnace 12 over at least a part of the heating bars 36. Dust which is to be rendered inert is introduced through the injection nozzle 38 into the loose material bed formed by the heat carrier 34.

In order to guarantee a defined residence time in respect of the flue gases produced, in the furnace 12, provided in the furnace 12 are the three series-connected flue gas chambers 18, 19 and 20 which in the illustrated embodiment extend in side-by-side relationship, to reduce the structural height of the assembly.

Arranged downstream of the last flue gas chamber 20 is a cyclone separator 40 in which dust in the flue gas is substantially separated off. Downstream of the clean gas side of the cyclone separator 40 and connected thereto by a conduit 42 is a recuperator 44, possibly with the interposition of a post-combustion apparatus for noxious chemical substances such as dioxines or the like.

Combustion air which comes from a blower 46 and which is required for the furnace 12 is passed through the recuperator 44, in a conduit 48. The blower 46 if necessary also supplies cooling air for the outlet 45 of the recuperator 44, through a branch conduit 50.

For starting the installation, the heating bars 36 are heated to between about 800° and 1000° C., with a greatly reduced fluidisation air flow. The heat carrier 34 which is thereby heated in the lower region, as well as the heated air, transmit the temperature, by virtue of the fluidisation effect and the resulting circulatory movement, to the entire bed of material formed by the heat carrier 34 until the latter has reached its desired temperature of between 750° and 800° C. A dust which is to be rendered inert and which is charged with organic substances is now injected into the heat carrier 34 in a controlled fashion, and heated in the heat carrier 34.

The steady amount of fluidisation air which is introduced into the interior 10 of the furnace beneath the fluidisation plate 30 by way of an air feed device 32 from the recuperator conduit 48 is controlled in dependence on the CO-value of the flue gas. In the illustrated embodiment, the pulsating fluidisation air passes through the recuperator conduit 48 by way of a branch conduit 49 to an air nozzle 47; a pulse valve 47$_a$ is disposed upstream of the air nozzle 47.

By virtue of its large surface area, the heat carrier 34 which is moved in the clockwise direction (arrow x) due to the flow of air from the lateral air nozzle 47 gives off its heat to the dust which burns when the ignition or firing temperature is reached, and in turn returns to the heat carrier 34 the energy produced by combustion of the dust, especially in the head or top region of the loose material bed of heat carrier material.

After the initial or start-up phase, the heating effect, which in the illustrated embodiment is produced by the electrical heating bars 34, can be reduced or switched off, depending on the respective energy content of the dust, and substantially autarkical combustion takes place.

Above the level of the bed of heat carrier material 34, as indicated at 35, an outlet 56 for inerted particles with a high speed of sinking movement opens into the furnace, the outlet 56 preferably being provided with a charging valve or lock device (not shown). At that location the flow speed is also to be selectively increased by the provision of a feed of fresh air as indicated at 54, in order to promote the discharge or dust. A quantitative regulating valve 52 is disposed in a conduit 49$_a$ which is disposed upstream of the fresh air feed 54.

The furnace interior 10 and the flue gas chambers 18, 19 and 20 are insulated for safety reasons and for reasons of saving energy, although that is not shown in detail in the drawing for the sake of clarity thereof.

I claim:

1. A process for the treatment of dust or the like which contains organic constituents, in particular filter dust from foundry sands containing binding agent, whereby the dust is introduced into a furnace and heated and burnt therein in the presence of a fluidisable heat carrier of refractory material, the improvement comprising: passing a first air flow through the heat carrier material at a flow rate sufficient to combust the organic constituents in the dust; and pulsing a second air flow through the heat carrier material at an intensity sufficient to circulate the heat carrier within the furnace.

2. A process according to claim 1 comprising preheating the heat carrier prior to introducing the dust into the furnace.

3. A process according to claim 2 comprising providing heating bars for heating the heat carrier.

4. A process according to claim 1 comprising heating the furnace to a combustion temperature sufficient to combust the organic constituents in the dust.

5. A process according to claim 4 comprising heating the dust by means of the heat carrier.

6. A process according to claim 1 comprising injecting the dust into a lower region of the heat carrier.

7. A process according to claim 1 comprising controlling the residence time of the dust in contact with the heat carrier by pulsing the second air flow for circulating the heat carrier within the furnace.

8. An apparatus for the treatment of dust or the like which contains organic constituents, in particular filter dust from foundry sand containing binding agent, whereby the dust is introduced into a furnace and heated and combusted therein in the presence of a fluidisable heat carrier of refractory material, the improvement comprising: fluidisation plate means provided in the furnace for supporting the heat carrier material within a combustion zone of the furnace; heating means located within said heat carrier material for heating said carrier material for combusting said dust; first air inlet means for passing a first air flow through the heat carrier material at a flow rate sufficient to combust the organic constituents in the dust; second air inlet means for pulsing a second air flow through the heat carrier material at an intensity sufficient to circulate the heat carrier within the furnace; and dust inlet means for feeding the dust into the heat carrier material.

9. An apparatus according to claim 8 wherein said heating means comprises at least one heating bar which extends above the fluidisation plate means.

10. An apparatus according to claim 9 wherein the said at least one heating bar is an electrical heating bar.

11. An apparatus according to claim 9 wherein said heating means is proximate to said fluidisation plate means and said dust inlet means injects the dust into said heat carrier material at a location above the heating means.

12. An apparatus according to claim 8 wherein a separator is provided downstream of said furnace for receiving flue gases therefrom.

13. An apparatus according to claim 12 wherein a heat exchanger is provided downstream of said separator.

14. An apparatus according to claim 11 wherein said second air inlet means is provided between said heating means and said fluidisation plate means.

* * * * *